United States Patent
Kraft et al.

(10) Patent No.: US 9,700,966 B2
(45) Date of Patent: Jul. 11, 2017

(54) JOINING A WORKPIECE IN A CONCEALED JOINING SEAM

(71) Applicant: FFT Produktionssysteme GmbH & Co. KG, Fulda (DE)

(72) Inventors: Martin Kraft, Eichenzell (DE); Jochen Schneegans, Wittgert (DE)

(73) Assignee: FFT Produktionssysteme GmbH & Co. KG, Fulda (DE)

( * ) Notice: Subject to any disclaimer, the term of this patent is extended or adjusted under 35 U.S.C. 154(b) by 0 days.

(21) Appl. No.: 14/892,029

(22) PCT Filed: May 15, 2014

(86) PCT No.: PCT/EP2014/059929
§ 371 (c)(1),
(2) Date: Nov. 18, 2015

(87) PCT Pub. No.: WO2014/187720
PCT Pub. Date: Nov. 27, 2014

(65) Prior Publication Data
US 2016/0107272 A1    Apr. 21, 2016

(30) Foreign Application Priority Data

May 22, 2013 (EP) .................................... 13168793

(51) Int. Cl.
*B23K 37/04*   (2006.01)
*B25J 9/16*    (2006.01)
(Continued)

(52) U.S. Cl.
CPC .............. *B23K 37/04* (2013.01); *B23K 9/028* (2013.01); *B23K 10/02* (2013.01); *B23K 13/02* (2013.01);
(Continued)

(58) Field of Classification Search
CPC ........ B23K 9/028; B23K 10/02; B23K 13/02; B23K 26/042; B23K 26/244;
(Continued)

(56) References Cited

U.S. PATENT DOCUMENTS 4,924,063 A    5/1990 Büchel et al.
7,577,285 B2 *  8/2009 Schwarz .............. B23K 9/0956
219/602

FOREIGN PATENT DOCUMENTS

DE        4402345    5/1995
DE     102007062535   6/2009
(Continued)

OTHER PUBLICATIONS

International Search Report for International Application No. PCT/EP2014/059929 mailed Jun. 5, 2014.
(Continued)

*Primary Examiner* — Brian Jennison
(74) *Attorney, Agent, or Firm* — RatnerPrestia

(57) ABSTRACT

A method for joining concealed workpiece parts by an energy beam, wherein a lower workpiece part and an upper workpiece part are positioned relative to each other; the upper workpiece part contacts the lower workpiece part along a joining contour; the energy beam is directed onto an upper side of the upper workpiece part, moved along the joining contour by a controller, in order to join the upper workpiece part to the joining contour; an exploratory seam is produced on the upper work piece part, for detecting the joining contour; a detector detects a boundary at which a surface area of the upper work piece part borders a surface area of the upper work piece part which does have contact with the joining contour; the controller registers a position of the boundary and compares it with a target position of the boundary which is stored in the controller.

17 Claims, 5 Drawing Sheets

(51) Int. Cl.
  *B23K 26/08* (2014.01)
  *B23K 9/028* (2006.01)
  *B23K 10/02* (2006.01)
  *B23K 13/02* (2006.01)
  *B23K 26/28* (2014.01)
  *B23K 26/042* (2014.01)
  *B23K 26/244* (2014.01)
  *B23K 37/02* (2006.01)
  *B23K 37/047* (2006.01)
  *B23K 101/00* (2006.01)

(52) U.S. Cl.
  CPC ........ *B23K 26/042* (2015.10); *B23K 26/0884* (2013.01); *B23K 26/244* (2015.10); *B23K 26/28* (2013.01); *B23K 37/0258* (2013.01); *B23K 37/047* (2013.01); *B23K 37/0452* (2013.01); *B25J 9/1684* (2013.01); *B25J 9/1694* (2013.01); *B23K 2201/006* (2013.01); *G05B 2219/37431* (2013.01); *G05B 2219/45104* (2013.01); *G05B 2219/4704* (2013.01); *G05B 2219/4705* (2013.01); *G05B 2219/4706* (2013.01)

(58) Field of Classification Search
  CPC  B23K 26/0884; B23K 26/28; B23K 37/0258; B23K 37/0452; B23K 37/04; B23K 2201/006; B25J 9/1684; B25J 9/1694
  See application file for complete search history.

(56) References Cited

FOREIGN PATENT DOCUMENTS

| | | |
|---|---|---|
| JP | 890266 A | 4/1996 |
| JP | 10244367 A | 9/1998 |
| JP | 2001252779 A | 9/2001 |
| WO | 2009140977 | 11/2009 |

OTHER PUBLICATIONS

Pires, J.N. et al., "Welding Robots: Technology, System Issues and Applications," 2006, Springer, pp. 1-11.
Sicard, P. and Levine, M.D., "An Approach to an Expert Robot Welding System," IEEE Transactions on Systems, Man and Cybernetics UDS, vol. 18, No. 2, Sep. 3, 1988, pp. 204-222.
International Preliminary Report on Patentability and Written Opinion of the International Searching Authority issued in PCT/EP2014/059929 dated Nov. 24, 2015.
Japanese Office Action issued in Japanese Application No. 2016-514336 dated Jan. 17, 2017, 7 pages.

* cited by examiner

JOINING A WORKPIECE IN A CONCEALED JOINING SEAM

CROSS REFERENCE TO RELATED APPLICATIONS

This application is the U.S. National Phase Application of PCT/EP2014/059929, filed May 15, 2014, which claims priority to European Patent Application No. 13168793.1, filed May 22, 2013, the contents of such applications being incorporated by reference herein.

FIELD OF THE INVENTION

The invention relates to a method for joining concealed workpiece parts by means of an energy beam.

BACKGROUND OF THE INVENTION

A joining technique is known in which two parts are to be joined to each other in an area in which one part is lying on the other, such that the joining seam for connecting the two parts has to be produced through the part lying on top, wherein the relative position of the two parts with respect to each other is usually determined by gauging the parts and gauging the positions of the two parts relative to each other in the joining position.

Once the two parts are calibrated in their joining position in the joining station, on energy beam can travel a predetermined joining trajectory along the joining contour and join the two parts, wherein the joining seam may be placed in a position in which a secure and permanent connection between the workpiece parts is not ensured, for example due to the accumulation of permitted production tolerances on the workpiece parts. These faulty workpieces can be detected by quality control and filtered out or submitted for reworking. This additional process step takes time and therefore increases costs.

DE 10 2007 062 535 A1, which is incorporated by reference, discloses a method for joining two workpiece parts using a beam, wherein a joining contour on a lower workpiece part is concealed by an upper workpiece part, such that the joining seam for joining the lower workpiece part and upper workpiece part has to be placed without being able to monitor in-line whether the joining seam has been correctly placed. The method includes gauging and aligning the workpiece parts before beginning the process of joining using a beam.

Gauging and aligning each workpiece is time-consuming and can therefore for example prolong a cycle time in a production line. This prolonged cycle time leads to a lower throughput per unit time and therefore increases costs.

SUMMARY OF THE INVENTION

There is therefore a need for a method using which it is possible to detect a position of a concealed joining contour before beginning the joining process, without having to gauge the workpieces in a complicated and/or costly way.

One aspect of the invention relates to a method for joining concealed workpiece parts by means of an energy beam, wherein in a first step, a lower workpiece part and an upper workpiece part are positioned relative to each other, wherein the upper workpiece part contacts the lower workpiece part over an area or linearly along a joining contour of the lower workpiece part when they are positioned, thereby concealing the joining contour. A target profile of the joining contour is known, in relation to a co-ordinate system, in a controller for the energy beam.

The upper workpiece part and the lower workpiece part together form a common joining contact, and the energy beam is directed onto an upper side of the upper workpiece part, which faces away from the lower workpiece part, and is moved along the joining contour or joining contact by a controller, in order to join the upper workpiece part to the joining contour of the lower workpiece part in a material lock.

Before beginning the actual process of joining the upper workpiece part to the lower workpiece part, an exploratory seam is produced on the upper side of the upper workpiece part using the energy beam, for detecting the joining contour or its exact position and alignment, respectively.

By means of a detector, a boundary is detected at which a surface area of the upper workpiece part which does not have any contact with the lower workpiece part borders a surface area of the upper workpiece part which does have contact with the joining contour. The controller registers a position of the boundary and compares it with a target position of the boundary which is stored in the controller.

If the controller determines that an actual position of the boundary deviates from the target position stored in the controller, a target profile of the energy beam along the joining contour is corrected.

The exploratory seam can extend from where it begins to where a first boundary is detected and beyond. The exploratory seam can in particular extend from the surface area of the upper workpiece part which does not have any contact with the lower workpiece part, over the surface area of the upper workpiece part which does have contact with the joining contour, into another surface area of the upper workpiece part which does not have any contact with the lower workpiece part, i.e. the exploratory seam can comprise a first boundary when the exploratory seam transitions from the surface area of the upper workpiece part which does not have any contact with the lower workpiece part into the surface area of the upper workpiece part which does have contact with the joining contour, and a second boundary on an opposite side of the upper workpiece part in contact with the joining contour when the exploratory seam transitions from the surface area of the upper workpiece part which does have contact with the joining contour into another surface area of the upper workpiece part not in contact with the joining contour.

A parameter which is characteristic of the exploratory seam, in particular a physical or chemical parameter, can be detected and monitored by the detector. Such a parameter can for example be a heat energy field of the exploratory welding seam, a current rating, a voltage or a gas flow rate.

The detector can for example be an optical detector which follows the energy beam at a short distance or is arranged to the side of the energy beam. The detector can for example detect a heat energy distribution in the exploratory seam even while the energy beam is producing the exploratory seam.

The value/s of the parameter/s which is/are detected by the detector can change abruptly at the boundary. This abrupt change indicates that the boundary or a boundary point from the surface area of the upper workpiece part which does not have any contact with the lower workpiece part to a surface area of the upper workpiece part which does have contact with the joining contour is situated at this location, wherein the detector for example detects an edge of the joining contour or another area of the joining contour which in particular abuts the upper workpiece part in a line, i.e. the exploratory seam extends on the upper side of the upper workpiece part which faces the energy beam, up to and into the surface area of the upper workpiece part which conceals the joining contour formed by or on the lower workpiece part.

The detected abrupt change in the parameter/s at the boundary or boundary point can be identified and registered by the controller, wherein "registered" means that the boundary is defined with respect to its x, y and z direction in a for example Cartesian co-ordinate system in which the dimensions and directions of the upper workpiece part and the lower workpiece part are known.

In order to obtain as exact a position as possible, the controller can comprise a filter algorithm which processes the value(s) of the parameter(s) detected by the detector, in order to at least partially eliminate known distortions in the data captured.

In particular in order to detect the exact position of a convoluted or angular joining contour below the upper workpiece part, it can be advantageous to produce at least two exploratory seams on the upper side of the upper workpiece part by means of the energy beam, at least one of which extends from the surface area of the upper workpiece part which does not have any contact with the lower workpiece part, over the surface area of the upper workpiece part which does have contact with the joining contour, into another surface area of the upper workpiece part which does not have any contact with the lower workpiece part, and the other of which extends at least from the surface area of the upper workpiece part which does not have any contact with the lower workpiece part into the surface area of the upper workpiece part which does have contact with the joining contour. Thus, at least two boundaries are detected by the detector, and actual positions of at least two boundaries or boundary points are registered by the controller. The actual positions of the boundaries can then be compared with the target positions of the boundaries which are stored in the computer, such that an actual profile of a concealed convoluted or angled joining contour of a workpiece can be determined.

Instead of the two exploratory seams, it is also possible for three or more exploratory seams to be placed by the energy beam and for more than three boundaries to be detected by the detector and registered by the controller. However, since each additional exploratory seam means increased material and/or energy consumption and thus takes time and therefore costs money, a necessary number of exploratory seams can be determined for each workpiece and each joining contour, and the beginning, direction and length of each joining seam can be defined, in advance of applying the method.

Once all the predetermined boundaries have been registered by the controller, the controller can determine the actual position of the joining contour concealed by the upper workpiece part, compare it with a target position of the joining contour and—if the actual position and target position of the joining contour deviate—correct a joining trajectory of the energy beam which is stored in the controller. The energy beam can then be guided by the controller on the upper side of the upper workpiece part along the actual position of the joining contour, in order to connect the upper workpiece part to the lower workpiece part in the concealed joining contour.

Alternatively, the movement of the energy beam can be corrected after a first boundary or a first and second boundary has/have been detected and registered, and the exploratory seam can transition into a joining seam along the joining contour without interrupting the movement of the energy beam, i.e. the controller compares the detected and registered actual position with the predetermined target position of the joining contour, and as applicable corrects for a first time the profile of the energy beam along the joining contour in the target position which is stored in the controller, even as it compares the actual position with the target position of the first boundary at which the surface area of the upper workpiece part which does not have any contact with the lower workpiece part switches to the surface area of the upper workpiece part which does have contact with the joining contour.

If, while the upper workpiece part is being joined to the lower workpiece part, the detector detects that the energy beam is switching from the surface area of the upper workpiece part which does have contact with the joining contour to a surface area of the upper workpiece part which does not have any contact with the lower workpiece part, the profile of the energy beam along the joining contour in the target position—which has already been corrected once in the controller—is corrected a second time. This process can be repeated until the energy beam is only then moved in the surface area of the upper workpiece part which does have contact with the joining contour.

This means that the energy beam is stabilised to an actual profile of the joining contour by the controller in a meandering movement.

The energy beam can exhibit a higher or lower energy for producing the joining seam than for producing the exploratory seam. The exploratory seam can be produced using an energy at which it is reliably ensured that at least one characteristic parameter of the exploratory seam changes abruptly when the energy beam switches from the surface area of the upper workpiece part which does not have any contact with the lower workpiece part into the surface area of the upper workpiece part which does have contact with the joining contour, or vice versa. If the exploratory seam transitions into the joining seam without interruption, the energy of the energy beam can for example be increased or reduced from an exploratory seam energy value to a joining seam energy value, when the detector detects the first boundary or at a later time which is for example predetermined in the controller.

Alternatively or additionally, the speed at which the energy beam is moved over the upper side of the upper workpiece part which faces it can be different when the exploratory seam is being produced and when the joining seam is being produced. The energy beam can for example be moved at a higher or lower speed when the exploratory seam is being produced than when the joining seam is being produced.

It generally holds during the entire method that boundaries are detected by the detector, the positions of the boundaries are registered by the controller and compared with the positions of the boundaries which are stored in the controller, and that if the position of at least one of the boundaries deviates, the movement of the energy beam along the joining contour is corrected in order to guide the energy beam into or back into the surface area of the upper workpiece part which does have contact with the joining contour.

The exploratory seam can be produced obliquely or transverse to the joining contour which is stored in the controller.

In particular when the exploratory seam which extends substantially transverse to the joining contour is being produced, the energy beam can connect or tack the upper workpiece part, at least at points, to the joining contour of the lower workpiece part in a material lock. The upper workpiece part is thus connected to the joining contour at points and defined for the subsequent joining process.

The detector can be a detector of a system for monitoring the quality of joining seams. The quality monitoring system is in particular one which can monitor the quality of a joining seam in-line, wherein "in-line" means that quality control is performed at substantially the same time as the joining seam or exploratory seam, respectively, is produced.

The joining method can be a welding method, a soldering method or an adhering method. In the adhering method, an adhesive can be used which is deposited onto the joining contour and activated by the heat energy of the energy beam, wherein in the adhering method and the soldering method, the energy of the energy beam for producing the exploratory seam can be sufficient to activate the adhesive or melt the solder, i.e. the increase in the energy of the energy beam described above with respect to the joining method can be omitted in the adhering method and/or soldering method if the energy beam transitions from the exploratory seam into the joining seam without interruption and is stabilised to the joining contour or to the surface area of the upper side of the upper workpiece part which contacts the joining contour, respectively, in a meandering form.

The welding method can for example be an electric arc welding method using a melting electrode (MIG, MAG), a laser welding method, a high-frequency induction welding method, a plasma welding method or another suitable welding method.

The method described can in principle be advantageously used to join any two workpiece parts in a concealed seam, wherein the upper workpiece part and the lower workpiece part can be formed from the same material, for example metal or plastic. The metal can be inter alia a thin-walled steel casting or a metal casting. It is however also possible for the upper workpiece part to be formed from a different material to the lower workpiece part comprising the joining contour.

The lower workpiece part can for example be a part of a motor vehicle structure or a motor vehicle body, and the upper workpiece part can for example be a part of a motor vehicle structure or a motor vehicle body, i.e. the method can advantageously be used in a production line for mass-produced articles such as motor vehicles.

In order to join the lower workpiece part to the upper workpiece part, the lower workpiece part and/or the upper workpiece part can be placed in a joining station and preferably fixed relative to each other, in the joining station or before they are placed in the joining station, wherein the joining station is a stationary joining station or a joining station which is connected to a robot arm and spatially moved by the robot arm during joining.

The joining station can be formed such that the lower workpiece part and the upper workpiece part lie in a known position in a co-ordinate system, for example a Cartesian co-ordinate system, after they have been placed in the joining station and/or fixed. This known position can be inputted into the controller and stored in the controller, i.e. the controller knows the theoretical position and the theoretical profile of the joining contour, which is concealed by the upper workpiece part, on the lower workpiece part and can guide the energy beam along the joining contour. Due for example to an accumulation of permitted tolerances on the upper workpiece part and the lower workpiece part, the joining contour may not lie at the target position which is stored in the controller. Thus, it may be that the controller does not reliably guide the energy beam along the joining contour and that the joining seam produced thus exhibits defects. In order to locate the concealed joining contour or its actual position, respectively, the exploratory seam can be produced on the upper side of the upper workpiece part by means of the energy beam, as described above.

In order to produce the exploratory seam and the joining seam, a beam-emitting part of a system which produces the high-energy beam and/or the detector of the quality control device can be affixed to a robot arm and form a combined joining and control tool. The robot arm can be able to be freely moved spatially.

Joining the lower workpiece part to the upper workpiece part can be performed as an uninterrupted joining process if the parts to be joined are respectively connected to a robot arm, such that they can be freely moved spatially, and the combined joining and control tool is a stationary tool or is connected to another robot arm, such that it can be freely moved spatially.

A method and device for joining components without using a clamping frame is known from WO 2009/140977, which is incorporated by reference, an international application of the Applicant's which is explicitly referenced here.

Another aspect of the invention relates to a computer program for performing the method described above.

A computer can feature: a digital microprocessor unit (CPU) with a data connection to a storage system and a bus system; a working memory (RAM); and a storage means. The CPU is designed to: implement commands which are embodied as a program which is stored in a storage system; detect input signals from the data bus; and emit output signals to the data bus. The storage system can feature various storage media such as optical, magnetic, solid-state and other non-volatile media, on which a corresponding computer program for performing the method and the advantageous embodiments is stored. The program can be designed such that it represents and/or is capable of performing the methods described here, such that the CPU can perform the steps of such methods and can therefore control the energy beam of the joining device.

A computer program which is suitable for performing a method comprises program code means for performing all the steps of the method when the program is run on a computer.

The computer program can be inputted by simple means into controllers which already exist, and can be used to control a method for joining a workpiece along a concealed joining seam.

Another aspect of the invention relates to a computer program product comprising program code means which are stored on a computer-readable data storage medium, in order to be able to perform the method described above when the program code means are run on a computer.

The computer program product can also be integrated into controllers as a retrofit option.

It holds for the entire description and the claims that the expression "a(n)" is used as an indefinite article and does not limit the number of parts to one. Where "a(n)" is intended to have the meaning of "only one", this will be understood by the person skilled in the art from the context or is unambiguously disclosed by the use of suitable expressions such as for example "one".

BRIEF DESCRIPTION OF THE DRAWINGS

An example embodiment is described below in more detail on the basis of the drawings, which show.

DETAILED DESCRIPTION OF THE INVENTION

Figure 1:
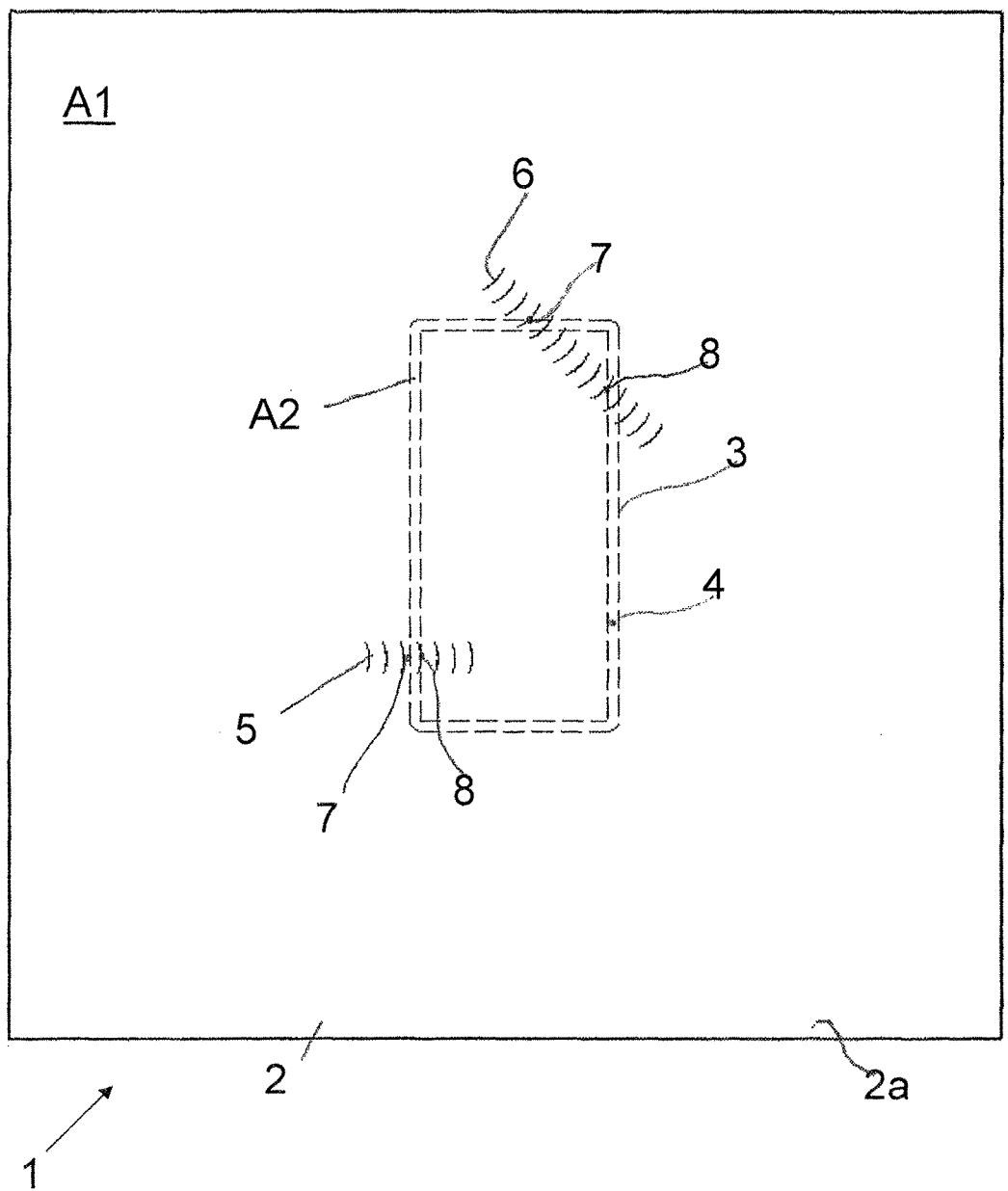
FIG. 1 a workpiece with two exploratory seams.

FIG. 1 shows a workpiece 1 consisting of an upper workpiece part 2 and a lower workpiece part 3. The upper workpiece part 2 lies on the lower workpiece part 3, such that an energy beam 10 shown in FIG. 4 cannot directly process the joining contour 4 along which the upper workpiece part 2 contacts the lower workpiece part 3.

In order to be able to determine an exact position of the lower workpiece part 3 relative to the upper workpiece part 2, two exploratory seams 5, 6 have been produced—in the example embodiment, by means of the energy beam 10—on an upper side 2a of the upper workpiece part 2 which faces the energy beam 10.

Since the approximate position of the lower workpiece part 3 relative to the upper workpiece part 2 is known with regard to general joining tolerances, the energy beam 10 can place the beginning of the exploratory seam 5; 6 on the upper side 2a of the upper workpiece part 2 in an area which already lies near the joining contour 4, wherein the exploratory seam 5; 6 is placed substantially transverse to the joining contour 4 or in the area of a corner or curve of the joining contour 4, such that it can detect the joining contour 4 before and after the corner.

Figure 4:
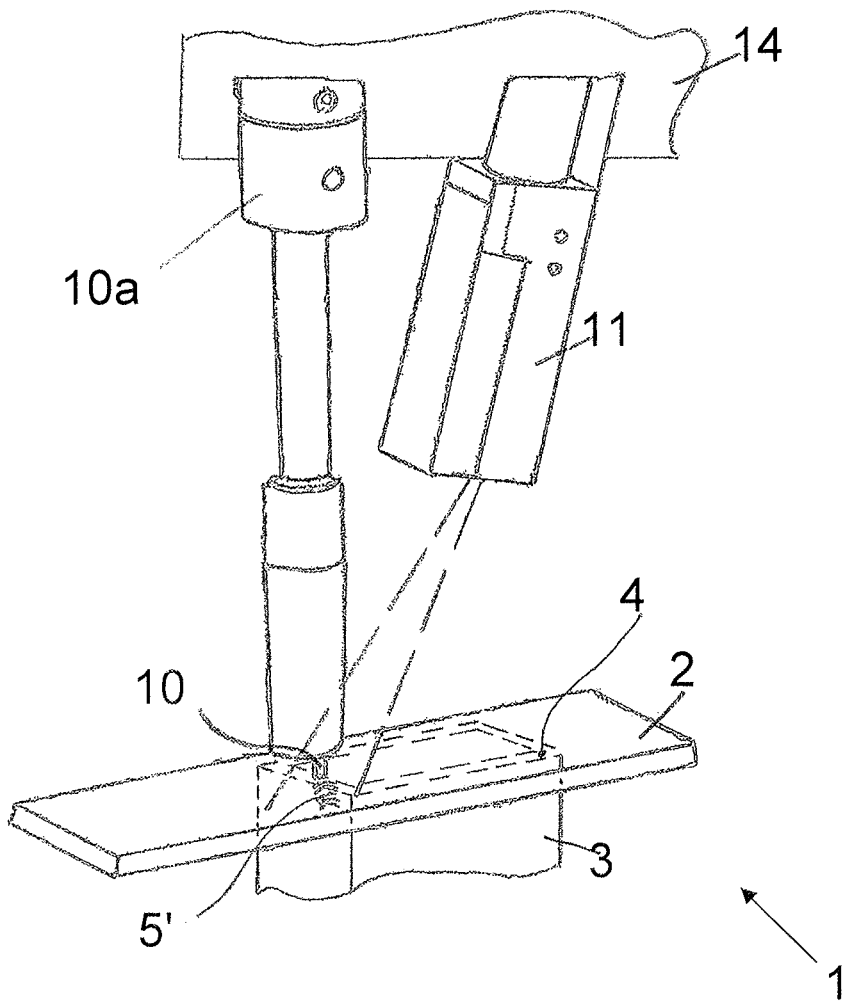
FIG. 4 a detailed view of an energy beam and a detector, when placing an exploratory seam.

When the exploratory seam 5; 6 is being produced, the exploratory seam 5; 6 or at least one typical parameter of the exploratory seam 5; 6, respectively, can be monitored by a detector 11 shown in FIG. 4. When the exploratory seam 5; 6 switches from a surface area A1 of the upper workpiece part 2 which does not have any contact with the lower workpiece part 3 to a surface area A2 in which the upper workpiece part 2 contacts the joining contour 4, the at least one parameter of the exploratory seam 5; 6 being monitored by the detector 11 changes abruptly. The same holds for the reverse case, when the exploratory seam 5; 6 switches from the surface area A2 to the surface area A1.

This means that the detector 11 can detect boundary or contact points 7, 8 in which the exploratory seam 5; 6 switches from the surface area A1 or A2 to the surface area A2 or A1. Since the position of the lower workpiece part 3 and the upper workpiece part 2 is known in a reference system, such as a Cartesian co-ordinate system, of for example a joining station 9, the positions of the contact points 7, 8 can be detected exactly. An actual position of the lower workpiece part 3 with respect to the upper workpiece part 2 then follows from the positions of the contact points 7, 8.

Using the known positions of the contact points 7, 8 of the exploratory seam 5; 6 or exploratory seams 5, 6, a target position of the lower workpiece part 3 with respect to the upper workpiece part 2 or a predetermined target joining trajectory of the energy beam 10, respectively, which is stored in a computer 12 which is not shown in FIG. 1, is corrected to an actual joining trajectory for the energy beam 10.

Figure 2:
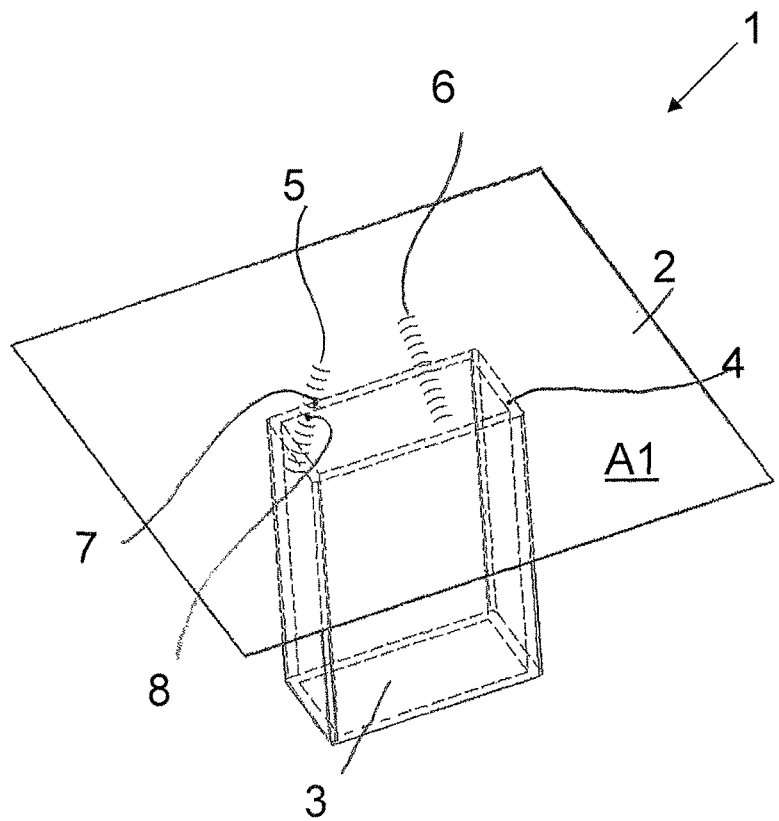
FIG. 2 the workpiece of FIG. 1 in a perspective lateral view.

FIG. 2 shows the workpiece 1 of FIG. 1 in a perspective view. The position of the joining contour 4 of the lower workpiece part 3 or the area in which the upper workpiece part 2 lies on the joining contour 4 of the lower workpiece part 3, respectively, is shown by the broken lines. The exploratory seams 5, 6 extend from a surface area A1 in which the upper workpiece part 2 does not contact the lower workpiece part 3, over a surface area A2 in which the upper workpiece part 2 contacts the joining contour 4 of the lower workpiece part 3, into another surface area A1, wherein the contact points 7, 8 at the boundaries between a surface area A1 and a surface area A2 and between a surface area A2 and a surface area A1 are detected by the detector 11 (not shown), and a current position and alignment of the lower workpiece part 3 relative to the upper workpiece part 2 is calculated from an actual position of the contact points 7, 8, as already described with respect to FIG. 1. This calculated position and alignment of the lower workpiece part 3 then serves as a basis for calculating a joining trajectory to be travelled by the energy beam 10 (not shown).

Figure 3:
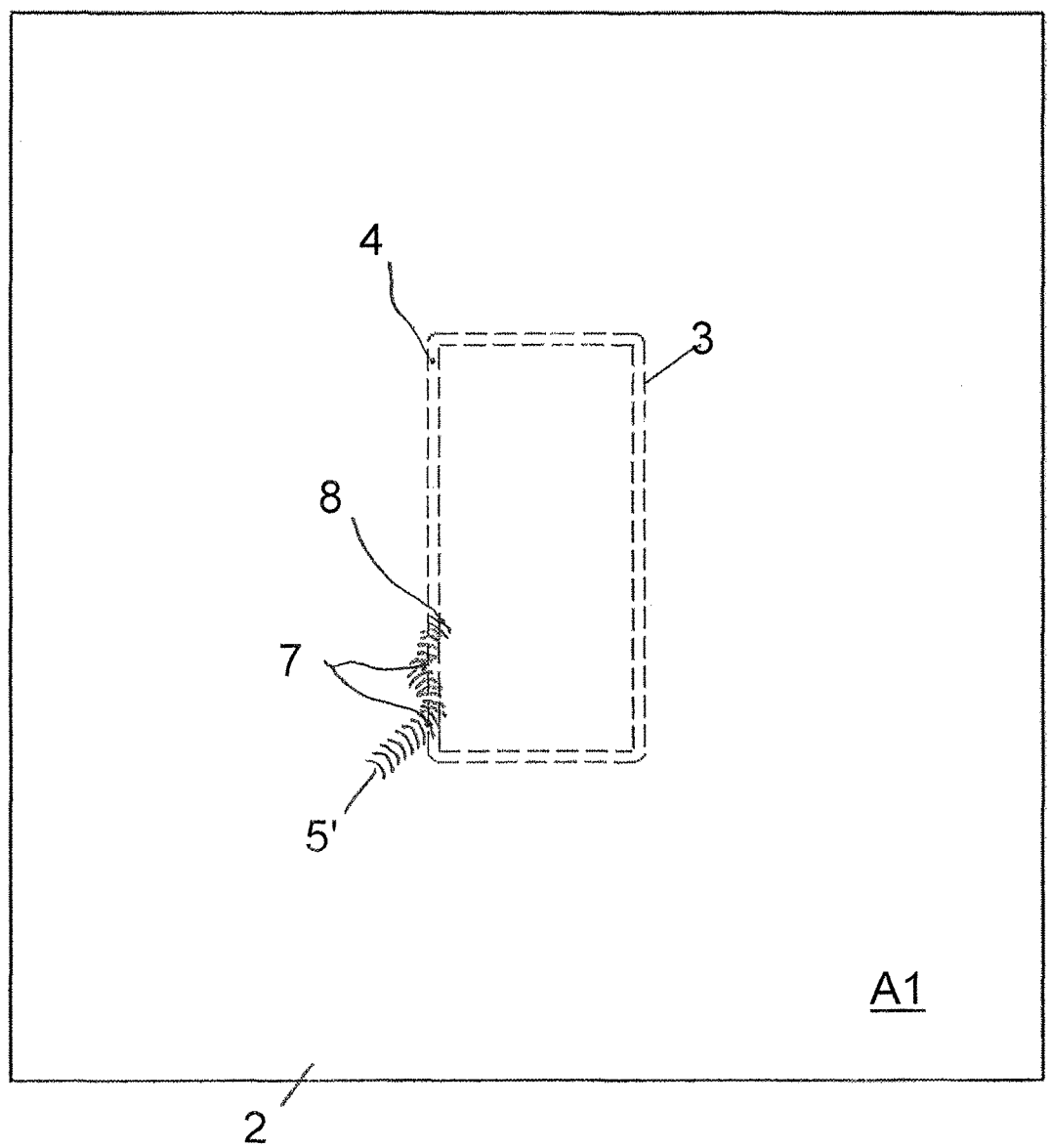
FIG. 3 a workpiece with an alternative exploratory seam.

FIG. 3 shows an alternative exploratory seam 5'. The exploratory seam 5' is produced at an acute angle to the joining contour 4. If the detector 11 then detects a contact point 7; 8, the target joining trajectory of the energy beam 10 which is stored in the computer 12 is immediately corrected, and the energy beam 10 pivots towards the actual position of the joining contour 4. If, shortly thereafter, the detector 11 detects another contact point 7; 8, this leads to another correction of the joining trajectory of the energy beam 10. This process can be repeated multiple times, until the energy beam 10 is stabilised to the correct actual joining trajectory for joining the workpiece 1 by the meandering movement, as shown in FIG. 3.

FIG. 4 shows an exploratory seam 5' being produced using the energy beam 10, and at least one typical parameter of the exploratory seam 5' being simultaneously monitored by the detector 11.

In the example embodiment shown, the energy beam 10 is a laser beam, and the detector 11 is an optical detector 11 of a quality assurance device using which the quality of a welding seam can be monitored in-line, i.e. while the welding seam is being produced or shortly after it has been produced.

Figure 5:
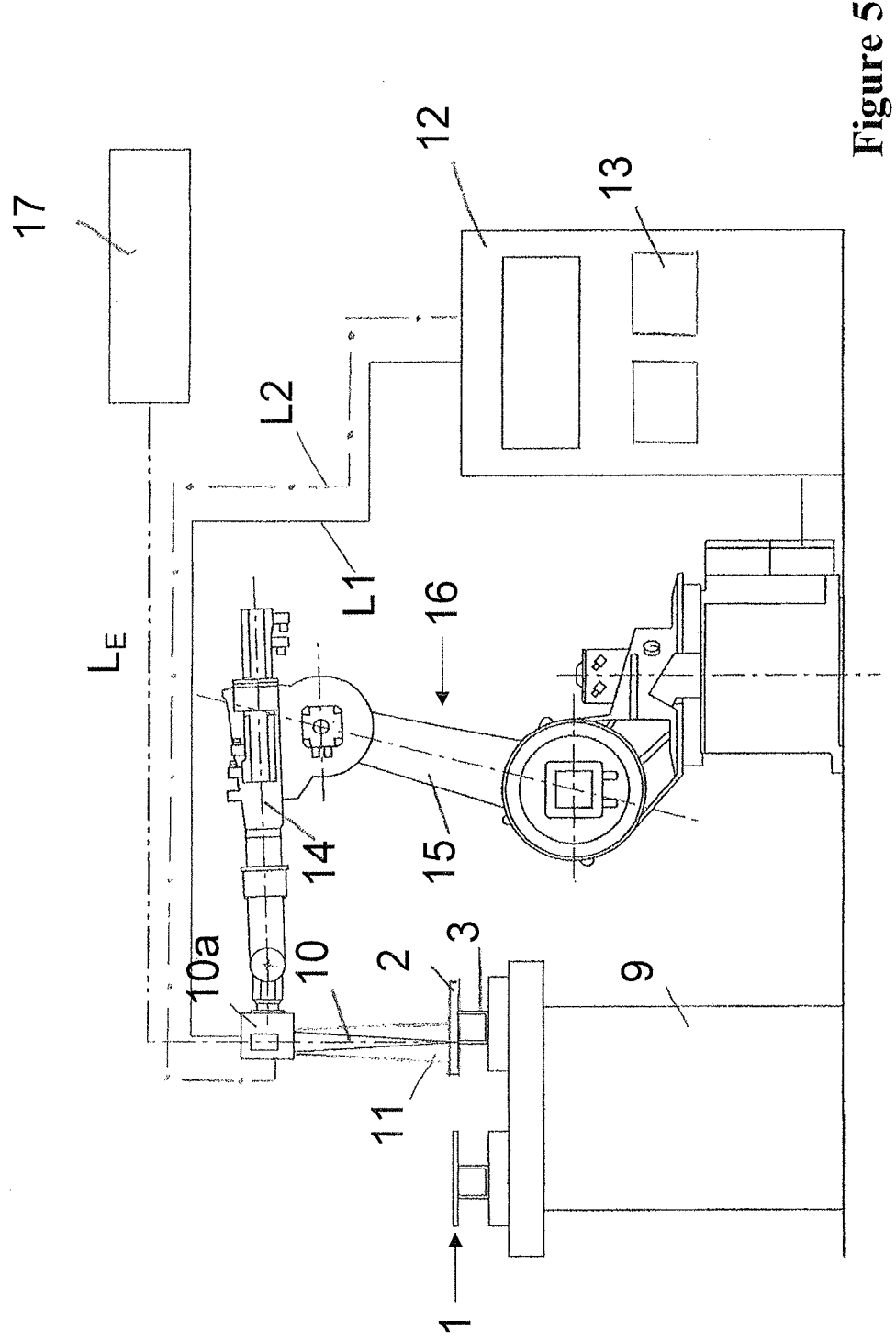
FIG. 5 a stationary joining station with a joining robot.

In the example embodiment, the detector 11 and a device 10a which emits the energy beam 10 are affixed to a common tool head 14 which, as shown in FIG. 5, is affixed to a robot arm 15 of an industrial robot 16. The robot arm 15 can move the combined joining and detection tool spatially, both along an exploratory seam and along a joining seam in accordance with FIGS. 1 and 3.

The exploratory seams 5, 6 of FIG. 1 are produced first and the energy beam 10 and the detector 11 are then moved to a predetermined starting point for joining the upper workpiece part 2 to the joining contour 4 of the lower workpiece part 3, while in the case of the alternative exploratory seam 5' shown in FIG. 3, the energy beam 10 transitions into the joining seam without interruption.

The energy beam 10 can connect the upper workpiece part 2 to the joining contour 4 of the lower workpiece part 3 at points even as it produces the exploratory seams 5, 6 of FIG. 1. The workpiece 1 is thus already pre-fixed in a material lock and can be joined, in its pre-fixed position, along the joining contour 4.

The energy beam 10 can produce the exploratory seam 5; 6 and the joining seam using the same energy and at the same speed. The exploratory seam 5; 6 can however also be produced using an energy which is greater than or less than the energy for producing the joining seam and/or at a speed which is less than or greater than the speed for producing the joining seam.

FIG. 5 shows an example of an arrangement comprising a stationary joining station 9 and an industrial robot 16. The industrial robot 16 comprises a robot arm 15 which bears a tool head 14. The detector 11 and the device 10a which emits the energy beam 10 are connected to the tool head 14.

The device 10a is connected to an energy source 17, which produces or provides the energy for the energy beam 10, via a line $L_E$ and to a computer 12, which for example controls the movements of the energy beam 10 and regulates the energy of the energy beam 10, via a line L1.

The detector 11 is connected to the computer 12 via a line L2 and transmits the captured parameter data which are typical of the welding seam, irrespective of whether it is an exploratory seam 5; 6 or a joining seam, to the computer 12.

The computer 12 comprises a memory 13 in which a target position of the upper workpiece part 2 with respect to the lower workpiece part 3 and a target joining trajectory for the energy beam 10 for joining the upper workpiece part 2 to the lower workpiece part 3 is stored for the workpiece 1 to be processed. The computer 12 can compare the data captured by the detector 11 with the target position data of the workpiece 1. If the computer 12 determines, on the basis of the boundaries or contact points 7, 8 detected by the detector 11, that the detected actual position of the joining contour 4 on the lower workpiece part 3 deviates from the target position of the joining contour or lower workpiece part 3, respectively, which is stored in the computer 12, it can correct the target joining trajectory for the energy beam 10 by means of an algorithm which is stored in the computer 12, such that the energy beam 10 can then be guided by the computer 12 along the detected actual profile of the joining contour 4.

Figure 6:
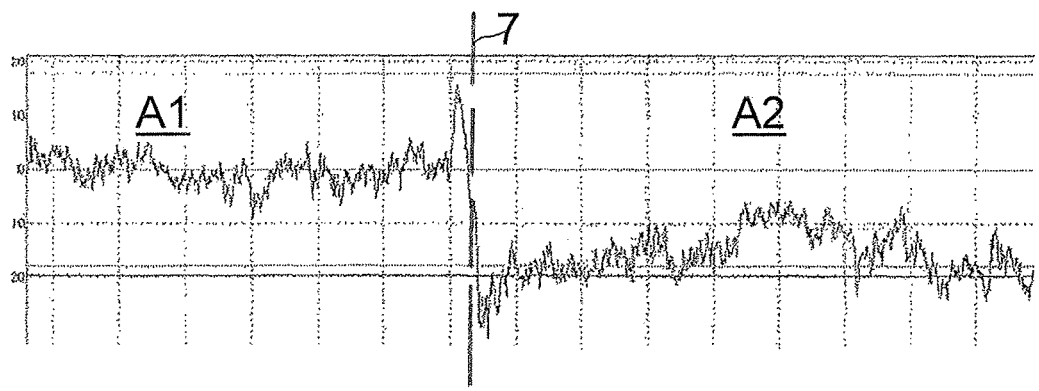
FIG. 6 an example of a measurement curve when detecting a boundary.

FIG. 6 shows a typical profile of a parameter of the exploratory seam 5; 6, as detected by the detector 11, at the boundary between the surface area A1 of the upper workpiece part 2 which does not have any contact with the lower workpiece part 3 and the surface area A2 in which the upper workpiece part 2 contacts the joining contour 4 of the lower workpiece part 3. The parameter detected by the detector 11 changes abruptly at the boundary between the surface area A1 and the surface area A2.

Since the point on the upper side 2a of the upper workpiece part 2 at which the energy beam 10 begins producing the exploratory seam 5; 6 is detected and registered or is predetermined, respectively, by the computer 12 and is stored in the computer 12, and since the direction and speed in/at which the energy beam 10 is moved when producing the exploratory seam 5; 6 are predetermined and are stored in the computer 12, the computer 12 can register the contact point 7; 8 on the basis of this abrupt change in the parameter and can calculate a correction for the joining trajectory of the energy beam 10 on the basis of the registered contact point 7; 8 or on the basis of multiple registered contact points 7, 8.

Although a number of possible embodiments of the invention have been disclosed in the preceding description, it will be appreciated that numerous other variants of embodiments exist through possible combinations of any of the technical features and embodiments mentioned and also any of the technical features and embodiments which are obvious to the person skilled in the art. It will also be appreciated that the example embodiments are to be understood merely as examples which in no way limit the scope of protection, applicability or configuration. The preceding description is instead intended to illustrate to the person skilled in the art a suitable way of realising at least one example embodiment. It will be appreciated that numerous changes with respect to the function and arrangement of the elements can be made to an example embodiment, without departing from the scope of protection disclosed in the claims and its equivalents.

LIST OF REFERENCE SIGNS 1 workpiece
2 upper workpiece part
2a upper side
3 lower workpiece part
4 joining contour
5, 5' exploratory seam
6 exploratory seam
7 contact point, boundary
8 contact point, boundary
9 joining station
10 energy beam
10a beam-emitting device
11 detector
12 computer
13 memory
14 tool head
15 robot arm
16 industrial robot
17 energy source
A1 surface area
A2 surface area
L1 line
L2 line
$L_E$ line

The invention claimed is:

1. A method for joining concealed workpiece parts by an energy beam, comprising:
  a) positioning at least one lower workpiece part and at least one upper workpiece part relative to each other;
  b) when the at least one lower workpiece and the at least on upper workpiece are positioned, the at least one upper workpiece part contacts the at least one lower workpiece part along a joining contour of the at least one lower workpiece part and conceals the joining contour, the target profile of which is known to a controller in relation to a co-ordinate system;
  c) directing the energy beam onto an upper side of the at least one upper workpiece part, which faces away from the at least one lower workpiece part, and is moved along the joining contour by the controller;
  d) producing an exploratory seam using the energy beam on the upper side of the at least one upper work piece part, for detecting the joining contour;
  e) detecting a boundary by a detector at which a surface area of the at least one upper work piece part, which does not have any contact with the at least one lower work piece part, borders a surface area of the at least one upper work piece part which does have contact with the joining contour;
  f) registering a position of the boundary by the controller and comparing it with a target position of the boundary which is stored in the controller;
  g) correcting a movement of the energy beam along the joining contour if the position of the boundary deviates; and
  h) joining the at least one upper workpiece part to the at least one lower workpiece part along the joining contour or along the corrected joining contour with the energy beam by adhesive bond after detection thereof.

2. The method according to claim 1, wherein the exploratory seam extends from the surface area of the at least one upper work piece part which does not have any contact with the at least one lower work piece part, over the surface area of the at least one upper work piece part which does have contact with the joining contour, into another surface area of the at least one upper work piece part which does not have any contact with the at least one lower work piece part, and the controller registers the positions of the two boundaries.

3. The method according to claim 1, wherein a parameter which is characteristic of the exploratory seam is detected and monitored by the detector.

4. The method according to claim 3, wherein values of the parameter which are detected by the detector change abruptly at the boundary due to an inherent characteristic of the material of the at least one upper workpiece.

5. The method according to claim 1, wherein at least two or three spaced exploratory seams are produced on the upper side of the at least one upper work piece part and are monitored by the detector.

6. The method according to claim 1, wherein a movement of the energy beam is corrected after the first or the first and second boundary has/have been registered, and the exploratory seam transitions into a joining seam along the joining contour without interrupting the movement of the energy beam.

7. The method according to claim 6, wherein the energy beam is stabilised to an actual profile of the joining contour by the controller in a meandering movement.

8. The method according to claim 5, wherein the positions of the boundaries are registered by the controller and compared with the positions of the boundaries which are stored in the controller, and if the position of at least one of the boundaries deviates, the movement of the energy beam along the joining contour is corrected.

9. The method according to claim 1, wherein the exploratory seam/s is/are produced obliquely or transverse to the joining contour.

10. The method according to claim 1, wherein when the exploratory seam/s is/are being produced, the at least one upper work piece part is connected, at least at points, to the joining contour of the at least one lower work piece part by adhesive bond.

11. The method according to claim 1, wherein the detector is a detector of a system for monitoring the quality of joining seams.

12. The method according to claim 1, wherein the at least one parameter is a heat energy or temperature, a light intensity, a wavelength, a current rating or another characteristic joining parameter.

13. The method according to claim 1, wherein the method for joining said concealed workpiece parts is a welding method or a soldering method or an adhering method.

14. The method according to claim 13, wherein said welding method is an electric arc welding method using a melting electrode, a laser welding method, a high-frequency induction welding method or a plasma welding method.

15. The method according to claim 1, wherein the lower work piece part is a part of a motor vehicle structure or a motor vehicle body, and the upper work piece part is a part of a motor vehicle structure or a motor vehicle body.

16. The method according to claim 1, wherein the at least one lower work piece part and/or the at least one upper work piece part are placed in a joining station in order to be joined and are preferably fixed relative to each other in the joining station or before they are placed in the joining station, or the at least one upper work piece part and the at least one lower work piece part are held by a robot arm each and positioned relative to each other by means of the robot arms, wherein the joining station is a stationary joining station or a joining station which is connected to a robot arm and spatially moved by the robot arm during or for joining.

17. The method according to claim 1, wherein the detector and/or at least a beam-emitting part of a system which produces the energy beam is/are affixed to a robot arm.

* * * * *